No. 639,658. Patented Dec. 19, 1899.
W. G. BROOKS.
HORSESHOE CALK.
(Application filed Oct. 2, 1899.)
(No Model.)
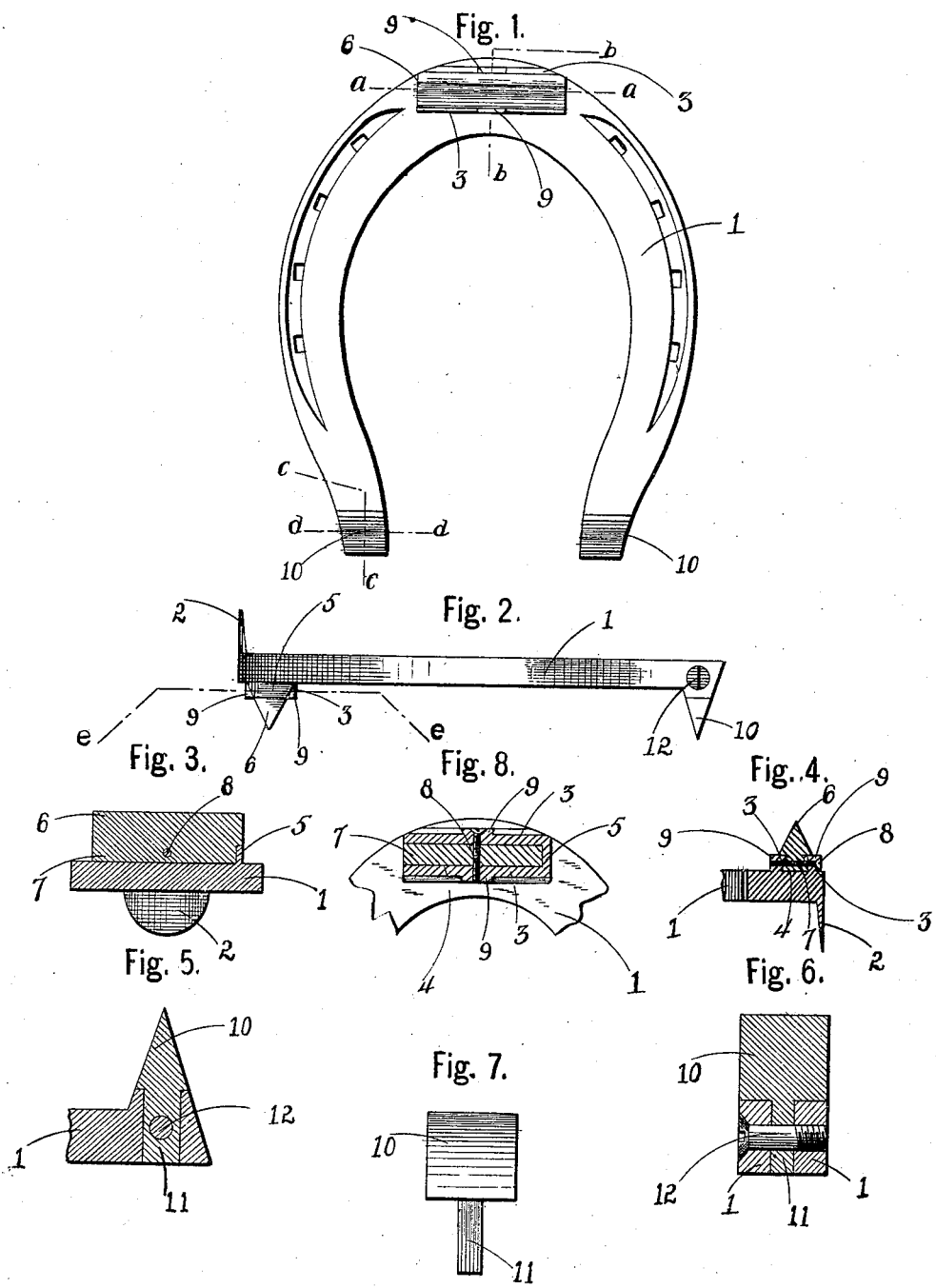
Witnesses.
L. M. Billings
G. A. Neubauer
Inventor.
Walter G. Brooks.
By A. J. Sangster Attorney.

UNITED STATES PATENT OFFICE.

WALTER G. BROOKS, OF BUFFALO, NEW YORK.

HORSESHOE-CALK.

SPECIFICATION forming part of Letters Patent No. 639,658, dated December 19, 1899.

Application filed October 2, 1899. Serial No. 732,280. (No model.)

*To all whom it may concern:*

Be it known that I, WALTER G. BROOKS, (having declared my intention to become a citizen of the United States,) residing at Buffalo, in the county of Erie and State of New York, have invented certain new and useful Improvements in Horseshoe-Calks, of which the following is a specification.

My invention relates to an improved horseshoe having detached heel and toe calks.

The object of the invention is to provide a horseshoe with easily-removable wearing parts, so as to lengthen the life of the shoe, all of which will be fully and clearly hereinafter described and claimed, reference being had to the accompanying drawings, in which—

Figure 1 represents a bottom plan view of the horseshoe with the removable calks in their adjusted position. Fig. 2 is a side view of the same. Fig. 3 is a section on or about line $a\ a$, Fig. 1. Fig. 4 is a section on or about line $b\ b$, Fig. 1. Fig. 5 is a section on or about line $c\ c$, Fig. 1. Fig. 6 is a section on or about line $d\ d$, Fig. 1. Fig. 7 is a detached side view of one of the heel-calks. Fig. 8 is a section on or about line $e\ e$, Fig. 2.

In referring to the drawings in detail like numerals designate like parts.

1 represents the body or main portion of the shoe, which is of the usual substantially U-shaped form, and an extension 2 projects upward from the outer edge of the middle portion of the body, which rests against the forward portion of the horse's hoof when the shoe is attached to the hoof.

A ridge or enlargement is formed upon the under surface of the middle portion of the shoe and is divided into two substantially parallel side walls 3 by a substantially central longitudinal depression or dovetailed slot 4, which extends entirely through one end of the enlargement and nearly to the opposite end, a sufficient amount of metal being left at that end to form a shoulder or stop 5 to limit the entrance of the toe-calk, as will be more specifically described farther on.

The toe-calk is formed of suitable metal and has a spur portion 6, which can be formed with a sharp point, as shown in the drawings, for winter use, or may be formed with a blunt point for summer use, and a reduced portion 7, the sides of which gradually diverge from each other to form a dovetail.

The toe-calk is secured to the shoe by slipping the dovetailed portion 7 into the depression 4, the side walls 3 of which converge gradually toward each other to correspond to the divergence of the sides of the reduced portion until one end of the portion 7 abuts against the shoulder 5, and then passing a locking-screw 8 through the sides 3 of the enlargement and the reduced portion 7 of the calk. (See Fig. 4.)

It is a well-known fact that most horses do not set their feet evenly upon the ground when traveling, but generally strike the ground with the outer portion of the shoe first, as the tendency would be in that case to force the toe-calk laterally inward, which would of course be prevented by the shoulder or stop 5 and obviate any great strain upon the locking-screw 8. By this means I have provided a horseshoe with a removable toe-calk, which is as strong as the ordinary shoe having permanent calks.

To strengthen the sides 3 and also furnish a thicker support for the locking-screw, the said sides are exteriorly enlarged by forming ribs 9 at or near their center, substantially as shown in Figs. 1 and 4, through which the locking-screw passes.

The heel-calks are formed with a spur portion 10 and a reduced portion 11, which are adapted to be inserted in vertical openings in the ends of the shoe-body and secured therein against vertical displacement by locking-screws 12, which pass laterally through horizontal openings in the ends of the shoe-body and the reduced portions. (See Figs. 5 and 6.)

As the strain upon the heel-calks when the horse is traveling is in an upward or horizontal direction and the tendency is to force the reduced portions of the calks closely into the openings in the ends of the shoe-body, all the strain is borne by the ends of the shoe-body and the reduced portions of the calks, the screws 12 simply serving to prevent the disengagement of the calks from the shoes.

The openings in which the locking-screws 8 and 12 are placed are all countersunk at one end to receive the heads of the screws, and thus permit them to be brought flush with the exterior surface of the shoe. This shoe can be bent to fit the shape of the horse's hoof without interfering with the detachment or attachment of the calks.

I claim as my invention—

A horseshoe comprising a body provided with vertical openings in its ends, and an enlargement extending from the under side of its middle portion, and divided into two sides by a central longitudinal dovetailed depression which terminates near one end to leave a shoulder or stop; said sides enlarging exteriorly near their center to form strengthening-ribs, heel-calks having reduced portions seating in the vertical openings in the ends of the body, locking-screws for securing them therein, a toe-calk having a dovetailed reduced portion adapted to slip in the depression in the enlargement with one end abutting against the shoulder, and a locking-screw passed through the ribs of the sides of the enlargement and the dovetailed reduced portion, as set forth.

WALTER G. BROOKS.

Witnesses:
L. M. BILLINGS,
G. A. NEUBAUER.